United States Patent [19]

McMurray et al.

[11] 4,442,968
[45] Apr. 17, 1984

[54] BRAZING FILLER METAL COMPOSITION AND PROCESS

[75] Inventors: John H. McMurray, Stratford; Jule Miller, Derby, both of Conn.

[73] Assignee: Avco Corporation, Stratford, Conn.

[21] Appl. No.: 435,668

[22] Filed: Oct. 21, 1982

Related U.S. Application Data

[62] Division of Ser. No. 281,793, Jul. 9, 1981, Pat. No. 4,394,347.

[51] Int. Cl.³ .............................................. B23K 1/04
[52] U.S. Cl. ................................. 228/231; 228/119; 228/194; 228/232; 228/238; 228/263.13
[58] Field of Search .............. 228/119, 194, 195, 198, 228/238, 231, 232, 263.13

[56] References Cited

U.S. PATENT DOCUMENTS

| | | | |
|---|---|---|---|
| 3,024,109 | 3/1962 | Hoppin | 228/238 |
| 3,632,319 | 1/1972 | Hoppin | 228/194 |
| 3,678,570 | 7/1972 | Paulonis | 228/194 |
| 4,008,844 | 2/1977 | Duvall | 228/119 |
| 4,078,977 | 3/1978 | Fountain | 228/119 |
| 4,285,459 | 8/1981 | Baladjanian | 228/119 |

FOREIGN PATENT DOCUMENTS 55-5173  1/1980  Japan .................................. 228/198

Primary Examiner—Nicholas P. Godici
Assistant Examiner—Marc Hodak
Attorney, Agent, or Firm—Ralph D. Gelling

[57] ABSTRACT

Disclosed is a brazing filler metal composition comprising, by weight, about 8% to 11% chromium, 2.0%–3.0% boron, 3.0%–4.5% silicon, 2.5%–4.0% iron, 7.0%–9.0% tungsten, a maximum of about 0.06% carbon and the remainder nickel. Further disclosed is a vacuum brazing process utilizing said filler metal composition.

9 Claims, No Drawings

BRAZING FILLER METAL COMPOSITION AND PROCESS

This is a division of application Ser. No. 281,793 filed July 9, 1981, now U.S. Pat. No. 4,394,347.

BACKGROUND OF THE DISCLOSURE

I. Field of the Invention

This invention relates, in general, to brazing filler metals and, more specifically, to filler metal compositions used to fill holes and repair damage in turbine engine high temperature components. In particular, the invention relates to novel filler metals which provide excellent high temperature corrosion and abrasion resistance. The invention further relates to a vacuum brazing process utilizing said filler metals.

II. Description of the Prior Art

Brazing consists of joining base metal surfaces by fusing a filler metal, having a lower melting point than the subject base metal, without appreciable fusion of the base metal surfaces themselves. For brazing, a flux may be applied to the subject base metal surfaces either prior to or simultaneously with the filler metal.

A satisfactory brazing flux flows at a temperature somewhat below the melting point of the filler metal; adheres to or wets the base metal surfaces; facilitates the flow and wetting of the filler metal over the subject base metal surfaces generally by reducing the surface tension of the molten filler metal; removes any oxide coating or other adherent foreign matter present on the subject base metal surfaces without appreciably attacking the base metal surfaces; inhibits re-oxidation of the subject base metal surfaces; and is capable of ready displacement by liquid filler metal either leaving no residue or leaving a readily removable, relatively inert residue after completion of the brazing.

Furnace brazing in a vacuum with the use of no flux offers several advantages. For example, the possibility of flux inclusions are eliminated and, accordingly, blind cavities, tortuous paths, and small passageways can be designed into the assembly without regard to flux removal or entrapment after brazing. In addition, fluxless vacuum brazing eliminates the cost of flux and its application, the need for cleaning the assembly after brazing, and potential corrosion of equipment and pollution of air and water by flux residues or flux reaction products.

Nickel-base, copper-base, gold-base, palladium-base, and a few silver-base filler metals are commonly used in vacuum furnace brazing. Apart from compatability with the base metal, filler metals are invariably selected for corrosion resistance in specific media and suitability for service at known operating temperatures.

Known brazing filler metal compositions, however, do not have the desired properties necessary for use in filling small holes and other defects in high temperature superalloys such as those used in turbine engine high temperature components. As a result, engines with small holes therein lose efficiency and parts must be scrapped. Moreover, known filler metals do not simultaneously give good wetting, but very limited flow and the ability to bridge defects, at a brazing temperature of about 1,950° F., so that defects are sealed without filler material flowing into internal passages in the components. In addition, known filler metals do not have the proper wetting and flow characteristics at a brazing temperature of 1,950° F. while also possessing the ability to fill and bridge holes as well as to provide excellent high temperature and corrosion resistance and, when properly coated, survive in the harsh environment of a turbine engine.

It is, therefore, an object of this invention to provide a brazing filler metal composition which is devoid of the above-noted disadvantages.

It is another object of this invention to provide a brazing filler metal composition which has desired properties for use in filling small holes and other defects in high temperature superalloys, such as those used in turbine engine high temperature components.

It is still another object of this invention to provide brazing filler metals which wet well and yet have very limited flow at a brazing temperature of about 1,950° F. while possessing the ability to fill and bridge holes.

It is yet another object of this invention to provide brazing filler metals which provide very good high temperature corrosion and abrasion resistance.

It is still another further object of this invention to provide brazing filler metal compositions wherein the brazing process may be accomplished in a single pass.

It is yet another object of this invention to provide a brazing filler metal which may be overcoated with coating schemes used for high temperature nickel superalloys.

It is yet another further object of this invention to provide a vacuum brazing process utilizing novel nickel-base filler metal compositions.

SUMMARY OF THE INVENTION

The foregoing objects and others are accomplished in accordance with this invention, generally speaking, by (a) providing a brazing filler metal composition comprising, by weight, from about 8.0% to about 11.0% chromium; from about 2.0% to about 3.0% boron; from about 3.0% to about 4.5% silicon; from about 2.5% to about 4.0% iron; from about 7.0% to about 9.0% tungsten; a maximum of about 0.06% carbon; and the remainder nickel and (b) utilizing said filler metal with a nickel-base superalloy in a vacuum brazing process.

DETAILED DESCRIPTION OF THE INVENTION

According to the present invention, any suitable metal may be vacuum-brazed using the novel filler metals described herein. Suitable metals include for example, superalloys such as nickel-base superalloys used in turbine engine components, among others. While any suitable metal may be vacuum-brazed using the filler metal of this invention, particularly good results are obtained with nickel-base superalloys.

While any suitable ratio of materials which comprise the filler metal composition of this invention may be used, excellent wetting, excellent ability to fill holes, and high temperature corrosion and abrasion resistance are achieved by providing a composition comprising, by weight, from about 8.0% to about 11.0% chromium; from about 2.0% to about 3.0% boron; from about 3.0% to about 4.5% silicon; from about 2.5% to about 4.0% iron; from about 7.0% to about 9.0% tungsten; a maximum of about 0.06% carbon and the remainder nickel. A preferred filler metal composition comprises, by weight, about 10.0% chromium; about 2.5% boron; about 4.0% silicon; about 3.5% iron; about 8.0% tungsten; about 0.04% carbon and the remainder nickel.

Both hot wall retort and cold wall radiant shield furnaces may be used in vacuum brazing. However, because of inherent advantages, cold wall furnaces are by far the more widely used. Cold wall furnaces heat faster and with greater efficiency, and are suitable for use at higher temperatures and vacuum pressures. At higher operating temperatures, the ability of the retort of the hot wall furnace to resist collapse is increasingly dependent on the supporting vacuum surrounding the retort.

The vacuum pumping system should be capable of evacuating a conditioned chamber to a moderate vacuum, such as, for example, about $10^{-3}$ torr, in about 1 hour. The temperature distribution within the work being brazed should be reasonably uniform (i.e., within about $\pm 10°$ F.).

The filler metals of the present invention may be coated with coating schemes used for high temperature superalloys. When properly coated, these filler metals survive in the harsh environment of a turbine engine. Depending upon the nature of the base metals to be repaired, a very thin layer of nickel may be plated onto the area needing repair prior to applying the filler metal.

A preferred brazing process for use with the filler metal composition of this invention is to (a) heat in a vacuum to about 1,740° F. and hold for about 1 hour to stabilize load temperature; (b) continue heating to about 1,950° F. (the brazing temperature) and hold for about 5 minutes so that the filler metal melts, wets and seals the defect; and (c) cool to about 1,800° F. and hold for about 3 hours.

The present invention will be further illustrated by the following examples in which parts and percentages are by weight unless otherwise specified.

EXAMPLE I

A component having a small hole and made of nickel-base superalloy is cleaned by vapor degreasing with common solvent (e.g. 1,1,1 trichloroethane). A thin layer of nickel (varying between about 0.0004-0.0008 inch in thickness) is plated onto the areas requiring repair. The component is then rinsed thoroughly and bake-dried. The filler metal composition which comprises, by weight, about 10.0% chromium, about 2.5% boron, about 4.0% silicon, about 3.5% iron, about 8.0% tungsten, about 0.04% carbon and the remainder nickel is then applied. (The filler metal is mixed in a slurry with a nitrocellulose binder and is applied to the areas to be repaired). The engine component is then heated to about 1,740° F. and held for one hour. Heating is then continued to about 1,950° F. (the brazing temperature) and held for about five minutes. The temperature is then reduced to about 1,800° F. and held for about 3 hours. After backfilling the chamber with chemically inert gas, the component is removed at about 400° F. and is air cooled. The dry brazed component is ready for use or further processing as soon as it is cool. Excellent brazing results are achieved.

EXAMPLE II

Example I is repeated with a filler metal composition comprising, by weight, about 8.0% chromium, about 2.0% boron, about 3.0% silicon, about 2.5% iron, about 7.0% tungsten, about 0.01% carbon and the remainder nickel. Excellent brazing results are achieved.

EXAMPLE III

Example I is repeated with a filler metal composition comprising, by weight, about 11.0% chromium, about 3.0% boron, about 4.5% silicon, about 4.0% iron, about 9.0% tungsten, about 0.06% carbon and the remainder nickel. Very good results are achieved.

While specific components of the present system are defined in the working examples above, any of the other typical materials indicated above may be substituted in the working examples, if appropriate. In addition, many other variables may be introduced into the brazing process, such as further purification steps, etc. which may in any way affect enhance, or otherwise improve the present process.

While various specifics are given in the present application, many modifications and ramifications will occur to those skilled in the art upon a reading of the present disclosure. They are intended to be covered herein.

What is claimed is:

1. A vacuum brazing process comprising (a) applying a brazing filler metal composition to a hole in a subject base metal, said filler metal composition comprising, by weight, from about 8.0% to about 11.0% chromium, from about 2.0% to about 3.0% boron, from about 3.0% to about 4.5% silicon, from about 2.5% to about 4.0% iron, from about 7.0% to about 9.0% tungsten, a maximum of about 0.06% carbon, and the remainder nickel, and said subject base metal having a higher melting point than said filler metal composition; (b) heating to the brazing temperature of the filler metal composition; and (c) cooling.

2. The brazing process of claim 1 wherein said filler metal composition comprises, by weight, about 10% chromium, about 2.5% boron; about 4.0% silicon; about 3.5% iron; about 8.0% tungsten; about 0.04% carbon and the remainder nickel.

3. The brazing process of claim 1 wherein said subject base metal is a nickel-base superalloy.

4. The brazing process of claim 1 wherein the brazing temperature of said filler metal composition is from about 1,940° F. to about 1,960° F.

5. The brazing process of claim 1 wherein the brazing temperature of said filler metal composition is about 1,950° F.

6. The brazing process of claim 3 wherein the brazing filler metal is overcoated with coatings used for nickel superalloys.

7. The brazing process of claim 3 wherein a thin layer of nickel is plated into said hole prior to application of said brazing filler metal composition.

8. The brazing process of claim 3 wherein the brazing assembly is (a) heated to about 1,740° F. and held for about 1 hour; (b) heating is then continued to the brazing temperature and held for about 5 minutes; and (c) the temperature is then reduced to about 1,800° F. and held to about 3 hours.

9. The brazing process of claim 8 wherein said brazing temperature is about 1,950° F.

* * * * *